United States Patent
Eklund

(10) Patent No.: US 12,358,561 B2
(45) Date of Patent: Jul. 15, 2025

(54) SUBFRAME ASSEMBLY FOR A VEHICLE

(71) Applicant: Volvo Car Corporation, Gothenburg (SE)

(72) Inventor: Johan Eklund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 8 days.

(21) Appl. No.: 18/133,652

(22) Filed: Apr. 12, 2023

(65) Prior Publication Data

US 2023/0249748 A1    Aug. 10, 2023

Related U.S. Application Data

(63) Continuation-in-part of application No. 17/568,008, filed on Jan. 4, 2022, now Pat. No. 11,648,983, which
(Continued)

(51) Int. Cl.
*B62D 21/11*    (2006.01)
*B60G 3/14*    (2006.01)

(52) U.S. Cl.
CPC .............. *B62D 21/11* (2013.01); *B60G 3/14* (2013.01); *B60G 2204/15* (2013.01); *B60G 2206/8201* (2013.01)

(58) Field of Classification Search
CPC ...... B62D 21/11; B60G 3/14; B60G 2204/15; B60G 2206/8201
See application file for complete search history.

(56) References Cited

U.S. PATENT DOCUMENTS 5,639,110 A * 6/1997 Pierce ................... B60G 9/003
280/124.11
7,210,706 B1    5/2007 Auston, Jr.
(Continued)

FOREIGN PATENT DOCUMENTS

CN    201753001 U    3/2011
CN    203110861 U    8/2013
(Continued)

OTHER PUBLICATIONS

US 3,684,382 A1, 04/2014, Buschjohann et al. (withdrawn)
List of References in corresponding Application No. U.S. Appl. No. 17/568,008.

*Primary Examiner* — Jason D Shanske
*Assistant Examiner* — Scott Lawrence Strickler
(74) *Attorney, Agent, or Firm* — Clements Bernard Walker; Christopher L. Bernard

(57) ABSTRACT

A subframe assembly for a vehicle, including: a straight arm; and a side bracket including a base coupled to an outboard side of the straight arm; wherein the outboard side of the straight arm defines a recess; and wherein an inboard side of the base of the side bracket includes a protrusion that nests conformally within the recess defined by the outboard side of the straight arm. Top and bottom edges of the outboard side of the straight arm, the recess, the inboard side of the base of the side bracket, and the protrusion are chamfered. The chamfered portions of the top and bottom edges of the outboard side of the straight arm, the recess, the inboard side of the base of the side bracket, and the protrusion are welded to join the side bracket to the outboard side of the straight arm.

14 Claims, 11 Drawing Sheets

Related U.S. Application Data is a continuation of application No. 16/829,365, filed on Mar. 25, 2020, now Pat. No. 11,247,726.

(56) References Cited

U.S. PATENT DOCUMENTS

| | | |
|---|---|---|
| 9,333,825 B2 | 5/2016 | Stockard |
| 9,783,234 B2 | 10/2017 | Tanaka et al. |
| 10,023,018 B2 | 7/2018 | Saudemont |
| 2006/0237939 A1* | 10/2006 | Hicks .................... B60G 9/003 280/124.157 |
| 2014/0183895 A1 | 7/2014 | Awano |
| 2014/0300137 A1 | 10/2014 | Komiya |
| 2014/0368000 A1 | 12/2014 | Komiya |
| 2017/0137071 A1* | 5/2017 | Kurokawa ........... B62D 27/023 |
| 2017/0166258 A1* | 6/2017 | Kim ..................... B62D 25/082 |
| 2018/0148095 A1 | 5/2018 | Lipa et al. |
| 2018/0237071 A1 | 8/2018 | Okumoto |
| 2018/0265131 A1 | 9/2018 | Tanaka et al. |

FOREIGN PATENT DOCUMENTS

| | | |
|---|---|---|
| CN | 208344337 U | 1/2019 |
| JP | 2018203054 A | 12/2018 |

\* cited by examiner

SUBFRAME ASSEMBLY FOR A VEHICLE

CROSS-REFERENCE TO RELATED APPLICATION(S)

The present disclosure is a continuation-in-part (CIP) of co-pending U.S. patent application Ser. No. 17/568,008, filed on Jan. 4, 2022, and entitled "SUBFRAME ASSEMBLY FOR A VEHICLE," which is a continuation (CON) of U.S. Pat. No. 11,247,726, issued on Feb. 15, 2022, and entitled "SUBFRAME ASSEMBLY FOR A VEHICLE," the contents of both of which are incorporated in full by reference herein.

TECHNICAL FIELD

The present disclosure relates generally to the automotive field, and specifically the internal combustion engine (ICE) vehicle, hybrid-electric vehicle (HEV), and electric vehicle (EV) fields. More particularly, the present disclosure relates to a subframe assembly (e.g., a front subframe assembly) for a vehicle that includes a strong, rigid connection between a crossmember, a straight arm, and a side bracket in the area of a control arm connection for a wheel suspension.

BACKGROUND

In some conventional and novel ICE vehicle, HEV, and EV designs, the engine or motor is coupled to a front (or rear) subframe assembly that may be partially or wholly extruded for weight and costs savings, as well as structural strength and overall vehicle integrity in the event of a crash. Extruded aluminum, for example, provides many advantages over steel box and/or cast constructions. This subframe assembly typically consists of a frame-like structure that includes at least one extruded crossmember (and likely a pair of extruded crossmembers) disposed between a pair of elongate extruded arm members. The engine or motor is coupled to the subframe assembly via a plurality of mounts (i.e., engine mounts or motor mounts).

In different crash load cases, the subframe assembly can receive huge amounts of energy. Ideally, the subframe assembly itself absorbs a significant amount of that energy (and transfers what is left to the battery frame in the rear part of the subframe, for example), achieves a low vehicle pulse index (i.e., g-forces), and has little to no intrusion into the occupant compartment of the vehicle.

Some vehicle subframes are casted, and thus undesirably brittle in a crash, and are thus designed to detach from the vehicle in the event of a crash. In such cases, the brittle structure does not absorb much energy, and upon detachment, such as at the connection between a crossmember, a straight arm, and an attachment bracket for a control arm connection of the wheel assembly, no further energy is absorbed by the subframe assembly. Some subframe assemblies including a connection between a crossmember, a straight arm, and an attachment bracket are rather configured to collapse in a crash. When a subframe assembly collapses, the subframe assembly does not absorb very much energy. Similarly, some subframe assemblies have the attachment bracket positioned between the crossmember and the straight arm, which shortens the straight arm and results in extra welds that serve as weak points during a crash and can affect the ductility of the straight arm. The shorter straight arms absorb less energy and the subframe assembly collapses at the welds, resulting in very little energy being absorbed by the subframe. While the subframe assembly can be strengthened in these scenarios by connecting the subframe assembly to the vehicle body, such as by screws, these connections can result in increased noise, vibration, and ride harshness for the vehicle occupants.

The above-described background relating to the various connections between members of a subframe assembly is merely intended to provide a contextual overview of some current issues and is not intended to be exhaustive. Other contextual information may become apparent to those of ordinary skill in the art upon review of the following description of exemplary embodiments.

SUMMARY

The present disclosure generally provides a subframe assembly with a strong, rigid connection between a crossmember, a straight arm, and a side bracket in an area of a control arm connection for a wheel suspension. In particular, the side bracket is metallurgically bonded to a side of the straight arm (at or close to an end of the straight arm), and both the side bracket and the straight arm are received into and metallurgically bonded to an end bracket of the crossmember, with the end bracket being positioned at an end of the crossmember. The use of this strong, rigid connection between the various components provides for the desired rigidity, ductility, and strength of the connection and its components, and in particular, the length, rigidity, and ultimate deformability of the straight arm, for a desired crashworthiness of the subframe assembly.

In one exemplary embodiment, the present disclosure provides a subframe assembly for a vehicle that includes a crossmember, a straight arm, and a side bracket. The crossmember includes an end bracket disposed at an end thereof. The straight arm is received into and metallurgically bonded to the end bracket of the crossmember. The side bracket includes a base and a rear bracket arm. The base is metallurgically bonded to a side of the straight arm adjacent to the end of the crossmember. The rear bracket arm extends from an end of the base and defines a hole adapted to receive a screw or pin for connecting a control arm of a wheel suspension to the subframe assembly. The rear bracket arm is at least partially received into and metallurgically bonded to the end bracket of the crossmember.

In one exemplary embodiment of the subframe assembly, a portion of the rear bracket arm protrudes from the end bracket of the crossmember and metallurgical bonds are formed at interfaces between the end bracket of the crossmember and protruding surfaces of the rear bracket arm. In another exemplary embodiment of the subframe assembly, the rear bracket arm includes an arm portion extending from and disposed orthogonal to the base and a body portion extending from the arm portion, the body portion extending beyond an end of the base, being offset from the base, and defining the hole. Optionally, the body portion defines a wedge shape with a truncated thin edge distal to the arm portion, the truncated thin edge being disposed proximal to a back portion of the crossmember. Optionally, the truncated thin edge defines an end surface of the rear bracket arm, and the end surface and top and bottom base surfaces of the wedge shape protrude from the end bracket of the crossmember. Optionally, metallurgical bonds are formed on protruded portions of each of the end surface, the top base surface, and the bottom base surface at edges of the end bracket of the crossmember that join the side bracket to the crossmember. Optionally, metallurgical bonds are also formed on side surfaces of the arm portion and the base at the edges of the end bracket of the crossmember that also join the side bracket to the crossmember. In a further exemplary embodiment of the subframe assembly, the straight arm defines a depression at an upper surface thereof adjacent to the side surface, and the depression is offset from the side bracket such that the depression does not overlap with the side bracket along a length of the straight arm. In a still further exemplary embodiment of the subframe assembly, the base is offset from the end of the straight arm.

In another exemplary embodiment, the present disclosure provides a side bracket adapted to connect a control arm of a wheel suspension to a subframe assembly for a vehicle. The side bracket includes a base, a middle bracket arm, and a rear bracket arm. The base is adapted to be metallurgically bonded to a side of a straight arm of the subframe assembly adjacent to an end of the straight arm. The middle bracket arm extends from and is disposed orthogonal to the base between ends of the base. The middle bracket arm defines a clearance hole adapted to receive a screw or pin adapted to connect the control arm to the subframe assembly. The rear bracket arm includes an arm portion and a body portion. The arm portion extends from and is disposed orthogonal to the base. The body portion extends from the arm portion. The body portion extends beyond one of the ends of the base, is offset from the base, and defines a hole adapted to receive the screw or pin. The body portion is adapted to be at least partially received into and metallurgically bonded to an end bracket of a crossmember of the subframe assembly. The end bracket is disposed at an end of the crossmember.

In one exemplary embodiment of the side bracket, the body portion defines a wedge shape with a truncated thin edge distal to the arm portion, the truncated thin edge defining an end surface adapted to be disposed proximal to a back portion of the crossmember. Optionally, the end surface and top and bottom base surfaces of the wedge shape are adapted to protrude from the end bracket of the crossmember. Optionally, the body portion defines an inner surface facing the middle bracket that defines an opening to the hole, and the body portion tapers from the inner surface to the end surface. Optionally, the body portion defines an angled surface distal to the arm portion that extends between the end surface and the inner surface, and an offset surface disposed proximal to the arm portion that extends parallel to and offset from a bottom surface of the base, the angled surface and the offset surface forming an acute angle.

In a further exemplary embodiment, the present disclosure provides a method for manufacturing a subframe assembly for a vehicle. The method includes metallurgically bonding a base of a side bracket to a side surface of a straight arm, wherein the side bracket includes the base and a rear bracket arm extending from an end of the base and defining a hole adapted to receive a screw or pin for connecting a control arm of a wheel suspension to the subframe assembly. The method also includes inserting an end of the straight arm and at least a portion of the rear bracket arm into an end bracket of a crossmember, wherein the end bracket is disposed at an end of the crossmember. The method further includes metallurgically bonding each of the end of the straight arm and the rear bracket arm to the end bracket of the crossmember.

In one exemplary embodiment of the method, the method further includes inserting an end of the base into the end bracket and metallurgically bonding the end of the base to the end bracket of the crossmember. In another exemplary embodiment of the method, a portion of the rear bracket arm protrudes from the end bracket of the crossmember, and metallurgically bonding the rear bracket arm to the end bracket of the crossmember includes forming metallurgical bonds at interfaces between the end bracket of the crossmember and protruding surfaces of the rear bracket arm. In a further exemplary embodiment of the method, the rear bracket arm includes an arm portion extending from and disposed orthogonal to the base and a body portion extending from the arm portion, the body portion extending beyond an end of the base, being offset from the base, and defining the hole, and inserting the end of the straight arm and the at least the portion of the rear bracket arm into the end bracket of the crossmember includes positioning the end of the straight arm and an end of the body portion proximal to a back portion of the crossmember. In a still further exemplary embodiment of the method, metallurgically bonding the base of the side bracket to the side surface of the straight arm includes locating the side bracket such that the base is offset from the end of the straight arm. In still a further exemplary embodiment of the method, the straight arm defines a depression at an upper surface thereof adjacent to the side surface, and metallurgically bonding the base of the side bracket to the side surface includes locating the side bracket such that the side bracket does not overlap with the depression along a length of the straight arm.

In another exemplary embodiment, the present disclosure provides a subframe assembly for a vehicle, the subframe assembly including: a straight arm; and a side bracket including a base coupled to an outboard side of the straight arm; wherein the outboard side of the straight arm defines a recess; and wherein an inboard side of the base of the side bracket includes a protrusion that nests conformally within the recess defined by the outboard side of the straight arm. Top and bottom edges of the outboard side of the straight arm, the recess, the inboard side of the base of the side bracket, and the protrusion are chamfered. The chamfered portions of the top and bottom edges of the outboard side of the straight arm, the recess, the inboard side of the base of the side bracket, and the protrusion are welded to join the side bracket to the outboard side of the straight arm. Optionally, the protrusion is a square or rectangular protrusion having radiused corners. Optionally, the protrusion is a hollow structure. The straight arm is an extruded structure. The side bracket is adapted to receive a suspension component of the vehicle.

In a further exemplary embodiment, the present disclosure provides a side bracket for a subframe assembly for a vehicle, the side bracket including: a base adapted to be coupled to an outboard side of a straight arm; wherein an inboard side of the base includes a protrusion that is adapted to nest conformally within a recess defined by the outboard side of a straight arm. Top and bottom edges of the inboard side of the base and the protrusion are chamfered. The chamfered portions of the inboard side of the base and the protrusion are adapted to be welded to join the side bracket to the outboard side of the straight arm. Optionally, the protrusion is a square or rectangular protrusion having radiused corners. Optionally, the protrusion is a hollow structure. The straight arm is an extruded structure. The side bracket is adapted to receive a suspension component of the vehicle.

In a still further exemplary embodiment, the present disclosure provides a straight arm for a subframe assembly for a vehicle, the straight arm including: an extruded structure having an outboard side adapted to be coupled to a side bracket; wherein the outboard side of the extruded structure defines a recess; and wherein the recess is adapted to conformally receive a protrusion of an inboard side of a base of the side bracket. Top and bottom edges of the outboard side of the straight arm and the recess are chamfered. The chamfered portions of the top and bottom edges of the outboard side of the straight arm and the recess are adapted to be welded to join the side bracket to the outboard side of the straight arm. Optionally, the protrusion is a square or rectangular protrusion having radiused corners. Optionally, the protrusion is a hollow structure. The side bracket is adapted to receive a suspension component of the vehicle.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF EMBODIMENTS

Again, the present disclosure generally provides a subframe assembly with a strong, rigid connection between a crossmember, a straight arm, and a side bracket in an area of a control arm connection for a wheel suspension. In particular, the side bracket is metallurgically bonded to the straight arm (at or close to an end of the straight arm), and both the side bracket and the straight arm are received into and metallurgically bonded to an end bracket of the crossmember with the end bracket being positioned at an end of the crossmember. The crossmember, the straight arm, and the side bracket can each be extruded aluminum, for example, having high-ductility and high-strength material properties.

The use of this strong, rigid connection provides for the desired rigidity, ductility, and strength of the connection and its components for a desired crashworthiness of the subframe assembly. In a crash event, the subframe assembly can deform, such as by bending into a U-shape, without detaching from the vehicle, while avoiding stack-up with other parts of the vehicle. In particular, the straight arm can bend in a designed location without interference from the side bracket to facilitate the desired deformation of the subframe assembly.

Figure 1:
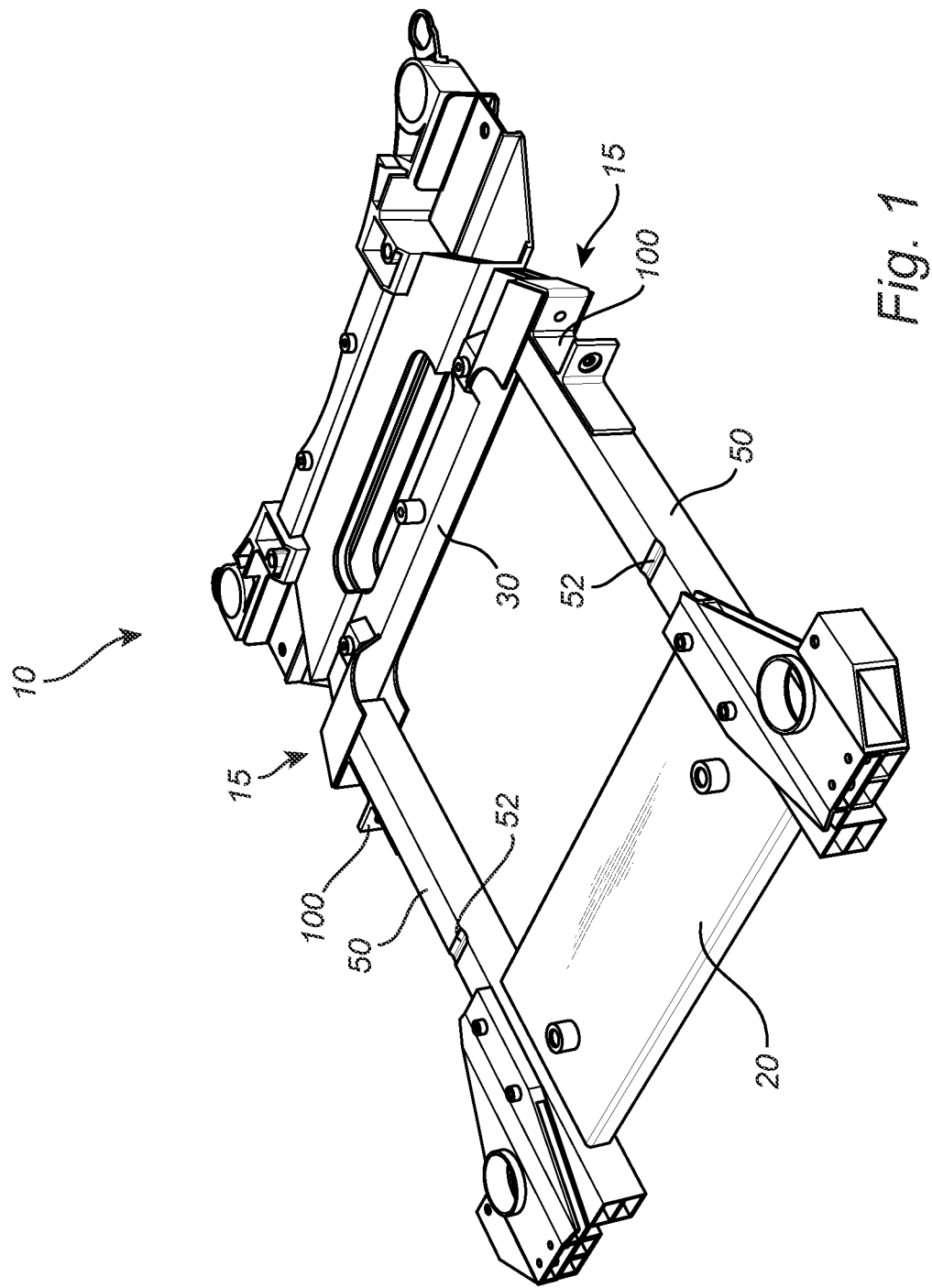
FIG. 1 is a perspective view of one exemplary embodiment of the (front) subframe assembly of the present disclosure.

FIG. 1 is a perspective view of one exemplary embodiment of the (front) subframe assembly 10 of the present disclosure. Referring to FIG. 1, in one exemplary embodiment, the subframe assembly 10 of the present disclosure includes a front crossmember 20, a rear crossmember 30, straight arms 50, and side arm brackets 100. Each of the front crossmember 20, the rear crossmember 30, the straight arms 50, and the side arm brackets 100 can include an extruded metal structure, such as an aluminum structure, having high-ductility and high-strength material properties. In some embodiments, at least the straight arms 50 are rectangular extruded structures. The use of extruded metal structures can provide a desired ductility and strength in the event of a crash, while keeping weight of the subframe assembly 10 to a minimum.

By way of example, the front crossmember 20, the rear crossmember 30, and the straight arms 50 may form a generally rectangular frame structure, which may include other spanning members that provide the frame structure with structural integrity and stability. This structural integrity and stability can further be established at the connections 15. At each connection 15, and as will be discussed in greater detail below, the rear crossmember 30, a straight arm 50, and a side bracket 100 are all metallurgically bonded to one another to form a strong, rigid connection.

Figure 2:
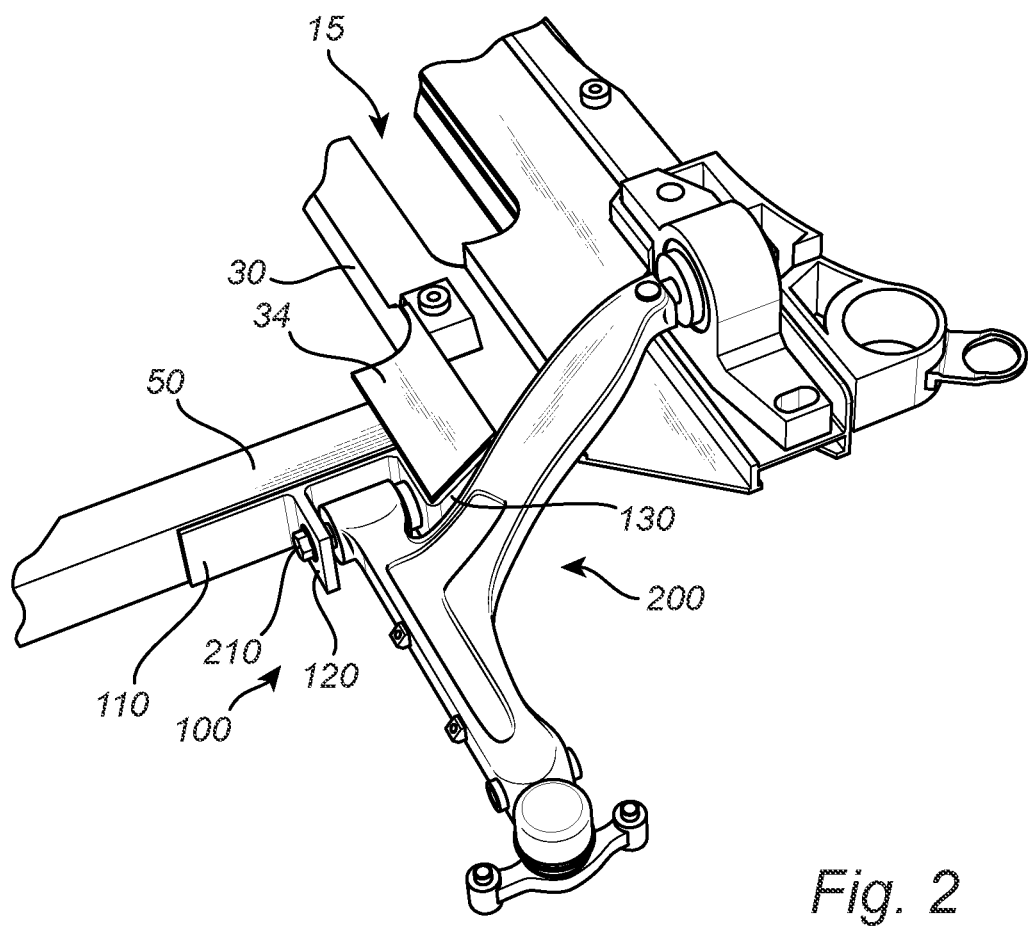
FIG. 2 is a partial perspective view of the subframe assembly of FIG. 1 at a connection between the (rear) crossmember, a straight arm, and a side bracket with a lower control arm of the wheel suspension connected thereto.
Figure 3:
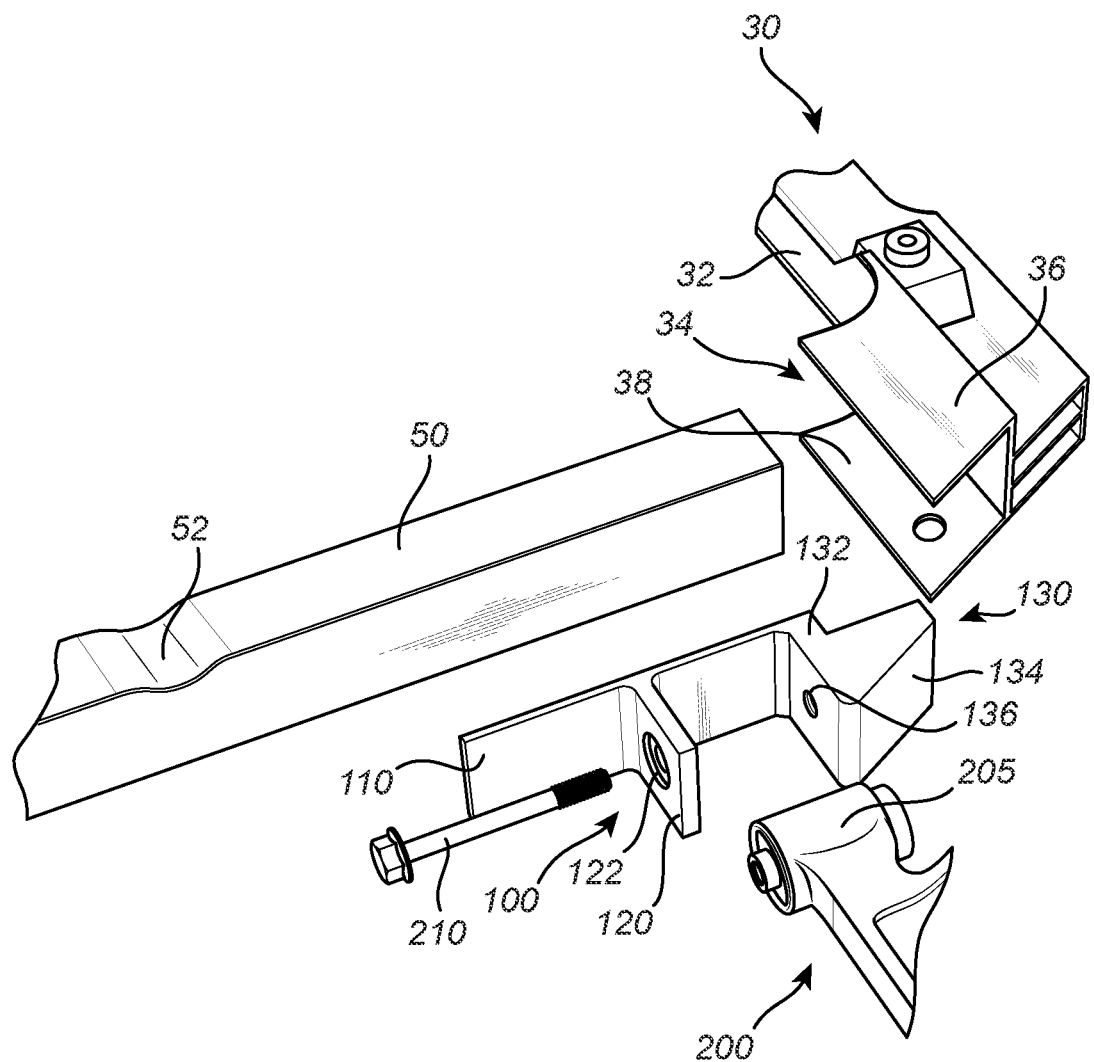
FIG. 3 is an exploded partial perspective view of the subframe assembly of FIG. 1 at the connection shown in FIG. 2 with the lower control arm of the wheel suspension.
Figure 4:
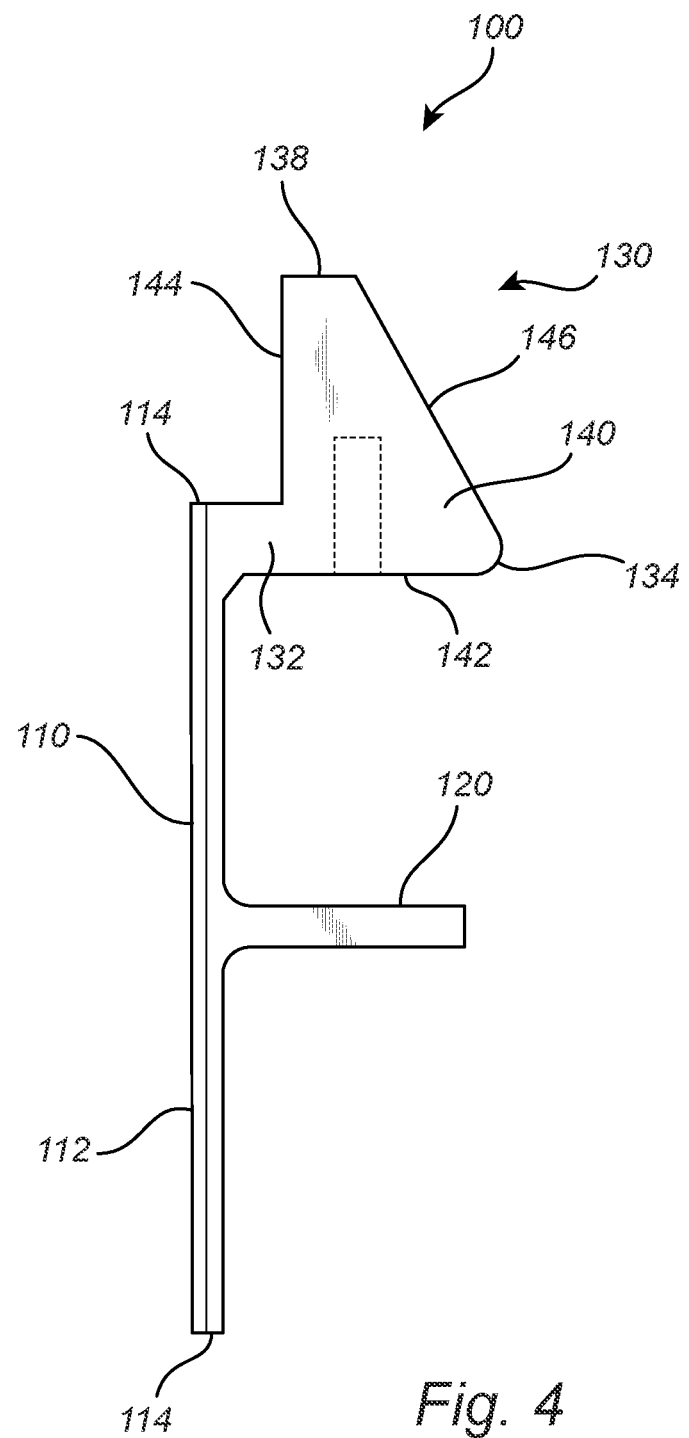
FIG. 4 is a side perspective view of the side bracket of FIGS. 1-3.

FIG. 2 is a partial perspective view of the subframe assembly 10 of FIG. 1 at the connection 15 between the rear crossmember 30, the straight arm 50, and the side bracket 100 with a lower control arm 200 of the wheel suspension connected thereto. FIG. 3 is an exploded partial perspective view of the subframe assembly 10 of FIG. 1 at the connection 15 shown in FIG. 2 with the lower control arm 200 of the wheel suspension. FIG. 4 is a side perspective view of the side bracket 100 of FIGS. 1-3. Referring to FIGS. 2 and 3, the rear crossmember 30 includes an end bracket 34 disposed at an end thereof. The rear crossmember 30 includes a back portion 32 extending a length of the rear crossmember 30, and an upper bracket arm 36 and a lower bracket arm 38, each extending from the end of the back portion 32 on opposite sides of the back portion 32. The back portion 32, the upper bracket arm 36, and the lower bracket arm 38 combine to form a U-shaped end bracket 34. While only one U-shaped end bracket 34 is described, a second U-shaped end bracket 34 can be located at an opposite end of the rear crossmember 30, as can be seen in FIG. 1.

The straight arm 50 can define a depression 52 at an upper surface thereof adjacent to the side surface of the straight arm 50. The depression 52 can be a slot extending across and transverse to a length of the straight arm 50. An end of the straight arm is received into and metallurgically bonded to the end bracket 34 of the rear crossmember 30.

The side bracket 100 includes a base 110, a middle bracket arm 120, and a rear bracket arm 130. The base 110 is metallurgically bonded to the side of the straight arm 50 adjacent to the end of the rear crossmember 30, and in particular, to the side located on an outer side of the subframe assembly 10. As can be seen in FIG. 1, the base 110 is metallurgically bonded to the side of the straight arm 50 in a position so that the depression 52 of the straight arm 50 is offset from the side bracket 100 such that the depression 52 does not overlap with the side bracket 100 along a length of the straight arm 50. The base 110 can also be offset from an end of the straight arm 50.

Referring to FIG. 4, the middle bracket arm 120 extends from and is disposed orthogonal to the base 110 between ends 114 of the base. The middle bracket arm 120 defines a clearance hole adapted to receive a control arm fastener 210, such as a screw or pin. As can be seen in FIGS. 2 and 3, the control arm fastener 210 is adapted to connect the control arm 200 of the wheel suspension, at a control arm bushing 205, to the subframe assembly 10.

The rear bracket arm 130 extends from an end 114 of the base and defines a hole 136 adapted to receive the control arm fastener 210. As can be seen in FIGS. 2 and 3, the rear bracket arm 130 is at least partially received into and metallurgically bonded to the end bracket 34 of the rear crossmember 40.

The rear bracket arm 130 includes an arm portion 132 and a body portion 134. The arm portion 132 can extend from and be disposed orthogonal to the base 110. The body portion 134 can extend from the arm portion 132. The body portion 134 can extend beyond one of the ends 114 of the base 110 and can be offset from the base 110. Here, the body portion 134 defines the hole 136. As can be seen in FIGS. 2 and 3, the body portion 134 is adapted to be at least partially received into and metallurgically bonded to the end bracket 34 of the rear crossmember 40.

The body portion 134 defines a wedge shape with a truncated thin edge distal to the arm portion 132. The truncated thin edge can define an end surface 138. The end surface 138 can be disposed proximal to the back portion 32 of the rear crossmember 40. As the base 110 can be offset from an end of the straight arm 50, the base 110 can be positioned such that the end surface 138 aligns with the end of the straight arm 50.

The wedge shape of the body portion 134 also defines base surfaces (top and bottom) 140, an inner surface 142, an offset surface 144, and an angled surface 146. As can be seen in FIG. 2, the end surface 138, and the base surfaces 140 of the wedge shape can protrude from the end bracket 34 of the rear crossmember 40.

The inner surface 142 faces the middle bracket 120 and defines an opening to the hole 136. The body portion 134 can taper from the inner surface 142 to the end surface 138. The angled surface 146 can be distal to the arm portion 132 and can extend between the end surface 138 and the inner surface 142. The offset surface 144 can be disposed proximal to the arm portion 132 and can extend parallel to and offset from a bottom surface 112 of the base 110. The angled surface 146 and the offset surface 144 can form an acute angle.

As disclosed above, the connection 15 is formed by metallurgically bonding the side bracket 110 to a side of the straight arm 50, and metallurgically bonding both the side bracket 110 and the straight arm 50 to the rear crossmember 30. Each of the metallurgical bonds can be a weld or other bond with the desired strengths and properties.

Figure 5:
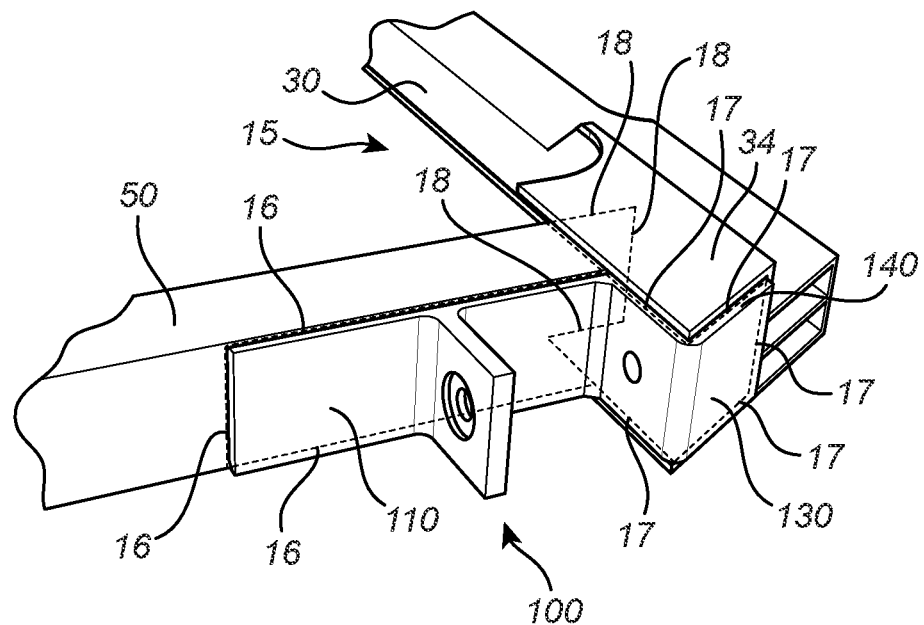
FIG. 5 is a partial perspective view of the subframe assembly of FIG. 1 at the connection shown in FIG. 2, illustrating locations of metallurgical bonds between members of the connection.
Figure 6:
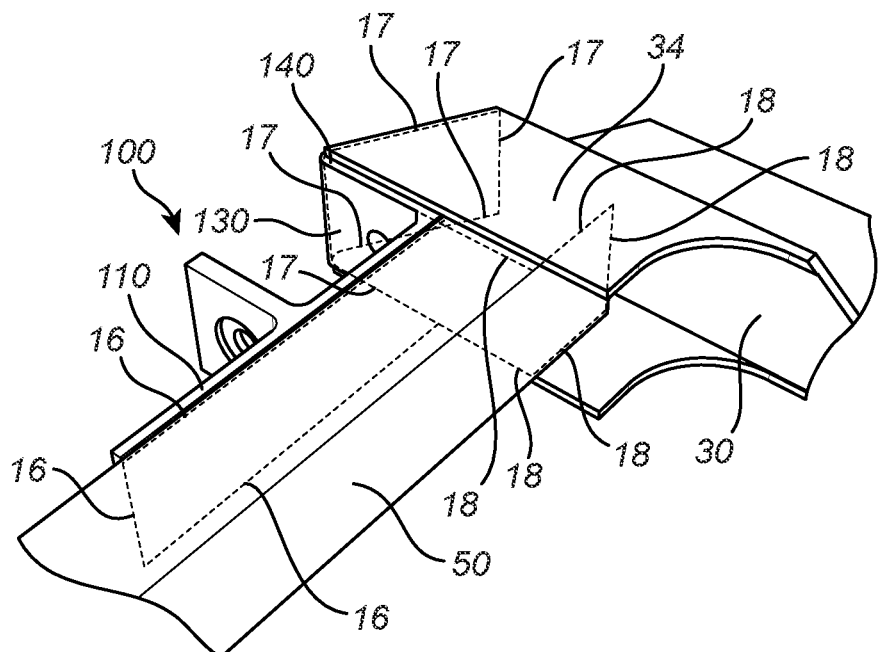
FIG. 6 is an alternative view of the partial perspective view of FIG. 5 illustrating locations of the metallurgical bonds between members of the connection.

FIG. 5 is a partial perspective view of the subframe assembly 10 of FIG. 1 at the connection 15 shown in FIG. 2, illustrating locations of metallurgical bonds 16, 17, 18 between members of the connection 15. FIG. 6 is an alternative view of the partial perspective view of FIG. 5, illustrating locations of the metallurgical bonds 16, 17, 18 between members of the connection 15. Referring to FIGS. 5 and 6, metallurgical bonds 16 join the side bracket 110 to the straight arm 50, metallurgical bonds 17 join the side bracket 110 to the rear crossmember 30, and metallurgical bonds 18 join the straight arm 50 to the rear crossmember 40. In FIGS. 5 and 6, some of the metallurgical bonds 16, 17, and 18 are behind the structures shown, but are still illustrated for informational purposes. The metallurgical bonds 16, 17, and 18 can be continuous bonds, separate bonds, and a combination thereof.

In particular, the metallurgical bonds 16 can be formed along the sides of the base 110 and along the end 114 of the base 110 opposite the rear bracket arm 120 adjacent to the bottom surface 112 of the base 110. The metallurgical bonds 16 can join the sides of the base 110 and the end 114 to the side surface of the straight arm 50.

A portion of the rear bracket arm 130 can protrude from the end bracket 34 of the rear crossmember 30 and the metallurgical bonds 17 can be formed at interfaces between the end bracket 34 of the rear crossmember 30 and protruding surfaces of the rear bracket arm 130. In particular, the metallurgical bonds 17 can be formed on protruding portions of each of the end surface 138, the top and bottom base surfaces 140 at edges of the end bracket 34 of the rear crossmember 30 to join the side bracket 100 to the rear crossmember 30. The metallurgical bonds 17 can also be formed on side surfaces of the arm portion 132 and the base 110 at the edges of the end bracket 34 of the rear crossmember 34 that also join the side bracket 100 to the rear crossmember 30. As such, the top and bottom base surfaces 140 can be joined to front and side edges of the upper and lower bracket arms 36 and 38 of the end bracket 34, and the end surface 138 can be joined to a side edge of the back portion 32 at the end bracket 34.

The metallurgical bonds 18 can be formed at interfaces between the end bracket 34 of the rear crossmember 30, and top and bottom surfaces of the straight arm 50 where the top and bottom surfaces begin to protrude from the end bracket 34. These metallurgical bonds 18 can extend orthogonal to the length direction of the straight arm 50 and can be continuous with one or more of the metallurgical bonds 17. Metallurgical bonds 18 can also be formed at interfaces between the inside surface of the straight arm 50, opposite the side surface to which the side bracket is metallurgically bonded to, and internal surfaces of the end bracket 34 (in particular, surfaces of the back portion 32, upper bracket arm 36 and lower bracket arm 38). As such, the top and bottom surfaces of the straight arm 50 can be joined to front edges of the upper and lower bracket arms of the end bracket 34, and the inside surface of the straight arm 50 can be joined to the internal surfaces of the back portion 32, the upper bracket arm 36 and the lower bracket arm 38.

Figure 7:
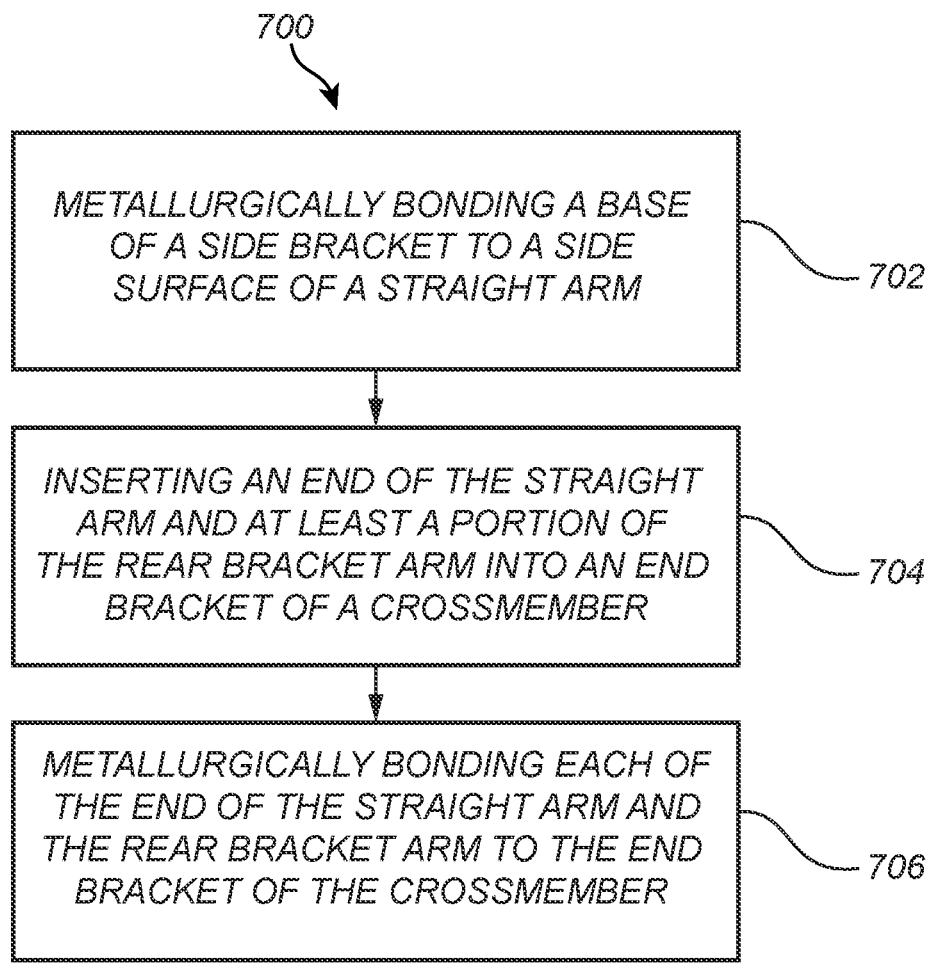
FIG. 7 is a flowchart of a method for manufacturing a subframe assembly for a vehicle.

FIG. 7 is a flowchart of a method 700 for manufacturing a subframe assembly for a vehicle. The method 700 includes metallurgically bonding a base 110 of a side bracket 100 to a side surface of a straight arm 50 at step 702. The side bracket includes the base 110 and a rear bracket arm 130 extending from an end of the base 110 and defines a hole 136 adapted to receive a screw or pin for connecting a control arm 200 of a wheel suspension to the subframe assembly 10. The method also includes inserting an end of the straight arm 50 and at least a portion of the rear bracket arm 130 into an end bracket 34 of a crossmember 30 at step 704. The end bracket 34 is disposed at an end of the crossmember 30. The method further includes metallurgically bonding each of the end of the straight arm 50 and the rear bracket arm 130 to the end bracket 34 of the crossmember 30 at step 706.

The method can include inserting an end of the base 110 into the end bracket 34 and metallurgically bonding the end of the base 110 to the end bracket 34 of the crossmember 30. In embodiments, a portion of the rear bracket arm 130 can protrude from the end bracket 34 of the crossmember 30, and the step of metallurgically bonding the rear bracket arm 130 to the end bracket 34 of the crossmember 30 includes forming metallurgical bonds 17 at interfaces between the end bracket 34 of the crossmember 30 and protruding surfaces of the rear bracket arm 130.

Further, the rear bracket arm 130 can include the arm portion 132 extending from and disposed orthogonal to the base 110 and a body portion 134 extending from the arm portion 132 with the body portion 134 extending beyond an end of the base 110, being offset from the base 110, and defining the hole 136. The step of inserting the end of the straight arm 50 and the at least the portion of the rear bracket arm 130 into the end bracket 34 of the crossmember 30 includes positioning the end of the straight arm 50 and an end of the body portion 134 proximal to a back portion 32 of the crossmember 30.

Yet further, the step of metallurgically bonding the base 110 of the side bracket 100 to the side surface of the straight arm 50 can include locating the side bracket 100 such that the base 110 is offset from the end of the straight arm 50. Still further, the straight arm 50 can define a depression 52 at an upper surface thereof adjacent to the side surface, and the step of metallurgically bonding the base 110 of the side bracket 100 to the side surface includes locating the side bracket 100 such that the side bracket 100 does not overlap with the depression 52 along a length of the straight arm 50. Thus, the metallurgical bonds of the side bracket 100 are only on a single end of the straight arm 50 relative to the depression 52 to prevent further stiffening of the subframe assembly 10 at the depression 52.

As discussed above, the connection 15 as disclosed herein can form a strong and rigid connection between the rear crossmember 30, the straight arm 50, and the side bracket 100 in the area of the control arm connection of a wheel suspension, while maintaining a long length of the straight arm 50 that is unencumbered by rigid connections to other components of the subframe assembly 10. This can preserve a desired ductility of the straight arm 50 over that length. This is at least partially facilitated by metallurgically bonding the side bracket 100 to a side of the straight arm 50 at an end thereof. This overall configuration along with the use of extruded metals for various components of the subframe assembly 10 can result in the subframe 10 having the ductility needed to properly deform and absorb energy during a crash event.

Figure 8:
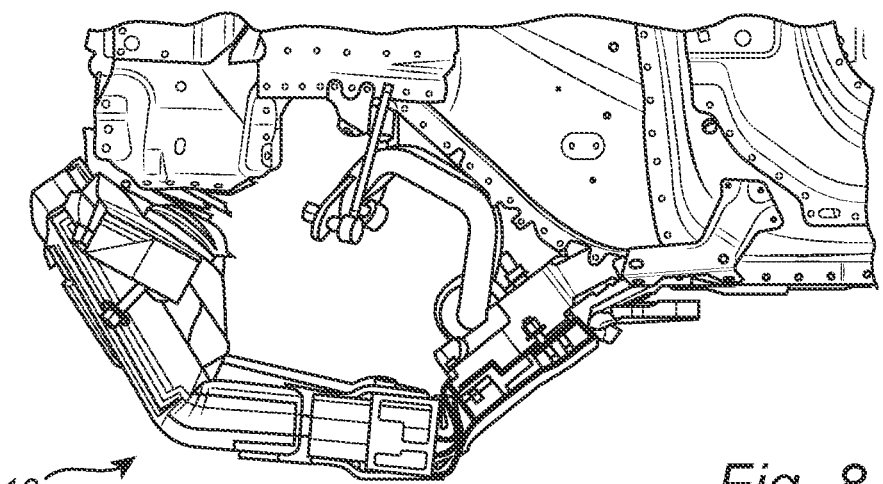
FIG. 8 is a side perspective view of the subframe assembly of FIG. 1 deformed from absorbing energy during a crash event.

In different crash load cases, the subframe assembly 10 can receive huge amounts of energy. FIG. 8 is a side perspective view of the subframe assembly 10 of FIG. 1 deformed from absorbing energy during a crash event. As can be seen in FIG. 8, during the crash event, the straight arm 50 can bend, such as at the location of the depression 52 and the subframe assembly 10 can generally deform into a U-shape, while the connections, such as the connection 15 stay intact due to the strength and rigidity of the connections. Other members of the subframe assembly 10 can also deform and absorb energy.

This deformation, while the connections are maintained, can result in the subframe assembly 10 absorbing a significant amount of energy during the crash event, which can prevent too much energy transfer from the subframe assembly 10 to the occupant compartment, can achieve a low vehicle pulse index and can prevent intrusion into the occupant compartment. Further, the deformation of the subframe assembly 10 into a U-shape can avoid stack-up with other parts of the vehicle.

Further, the connection 15 can simplify the connection to the lower control arm 200. As can be seen in FIGS. 2 and 3, the control arm bush 205 can be secured to the subframe assembly 10 via the side bracket 100 by a single control arm fastener 210, while other solutions require significantly more components and fasteners.

Further, the strong and rigid connection 15 between the rear crossmember 30, the straight arm 50, and the side bracket 100 as disclosed herein can strengthen the subframe assembly 10 so that the subframe assembly 10 is more durable under high misuse and endurance loads. Such durability is particularly important for heavy vehicles, such as EV vehicles.

Figure 9:
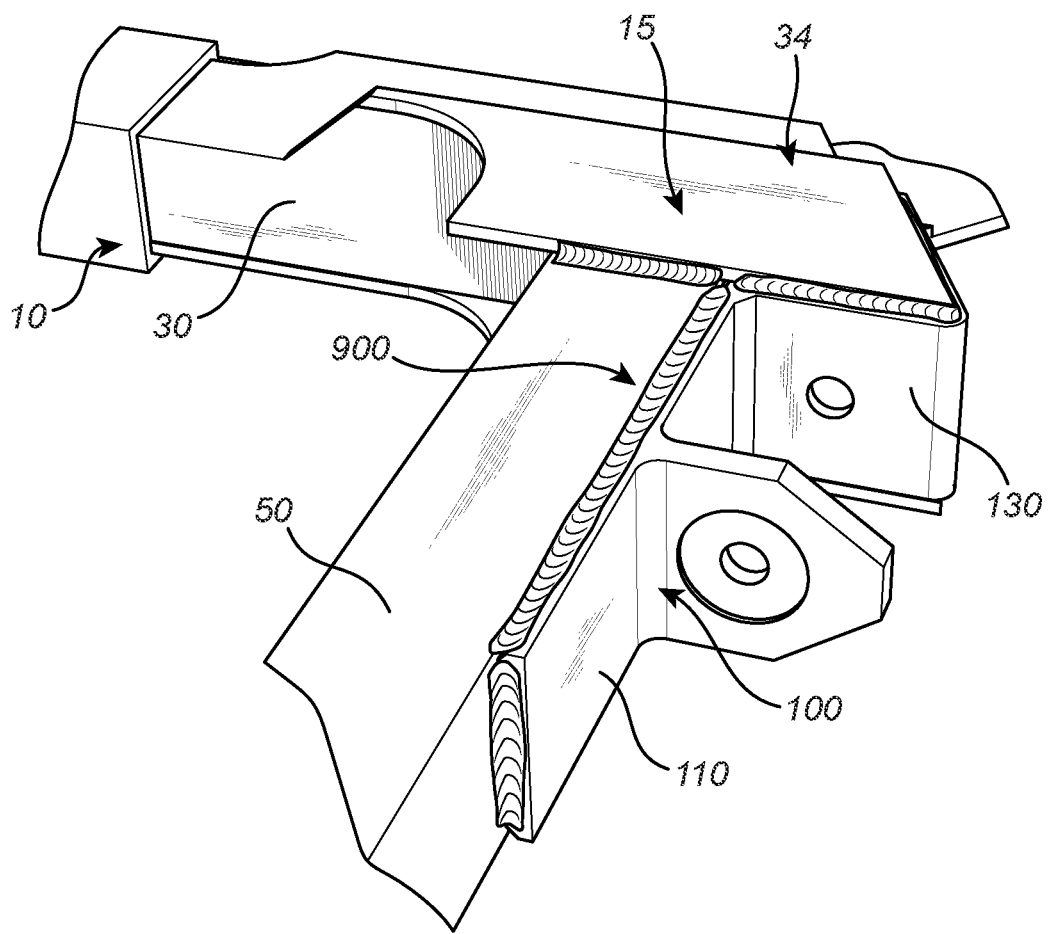
FIG. 9 is a partial perspective view of the subframe assembly at a connection between the (rear) crossmember, a straight arm, and a side bracket, highlighting the associated weld joints.
Figure 10:
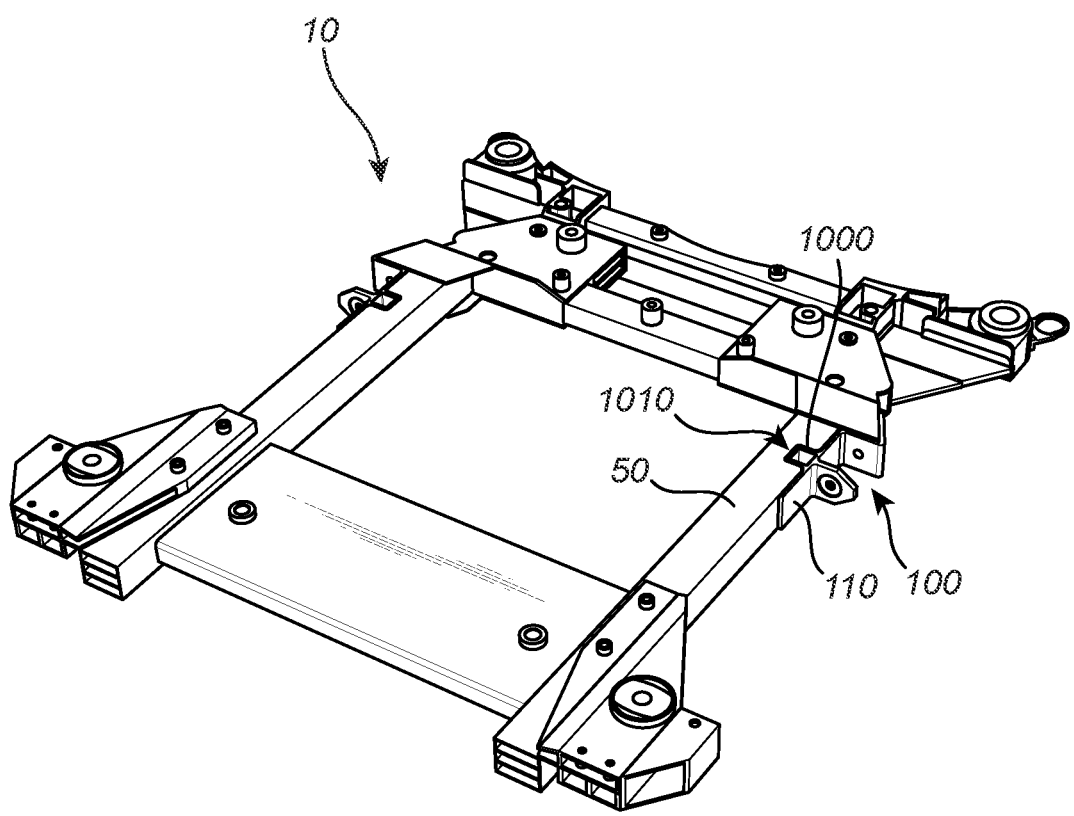
FIG. 10 is a perspective view of another exemplary embodiment of the (front) subframe assembly of the present disclosure, utilizing a side bracket with a base including an inboard side protrusion and a straight arm with a corresponding recess, as well as conformal chamfered weld joints.
Figure 11:
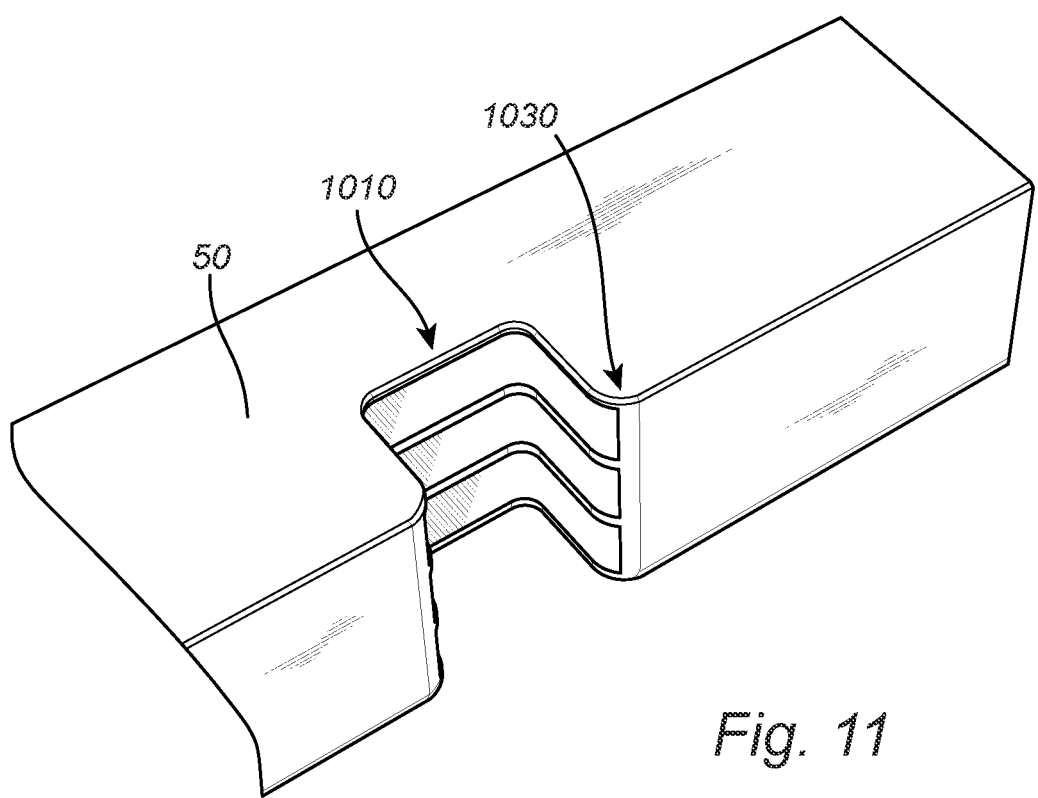
FIG. 11 is a partial perspective view of the straight arm and corresponding recess of FIG. 10.
Figure 12:
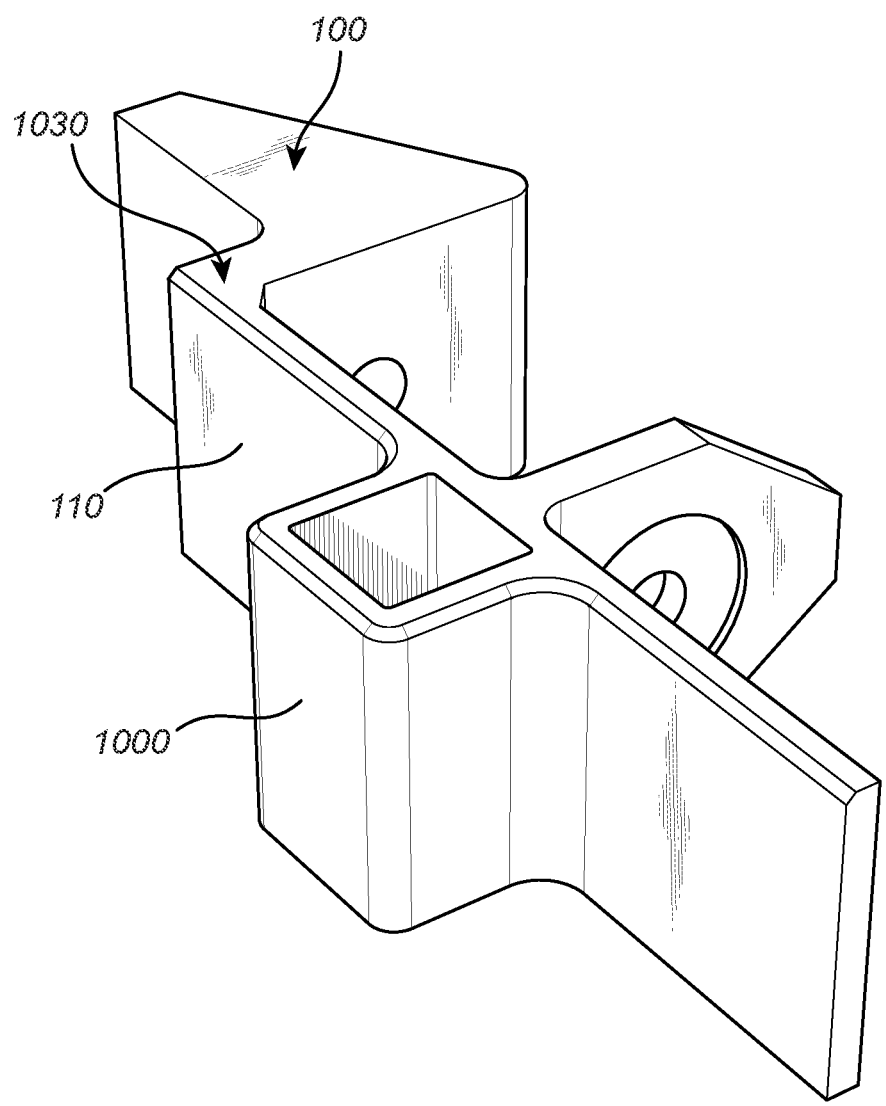
FIG. 12 is a perspective view of the side bracket with the base including the inboard side protrusion of FIG. 10.
Figure 13:
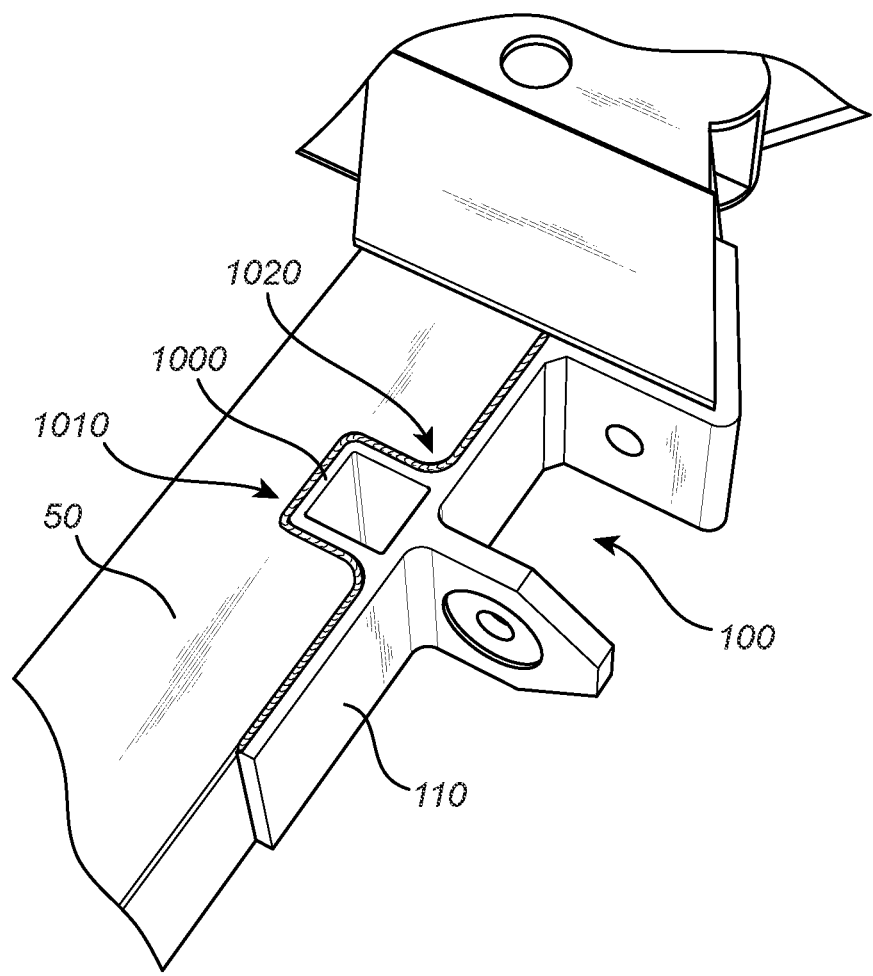
FIG. 13 is a partial perspective view of the side bracket with the base including the inboard side protrusion, the straight arm with the corresponding recess, and the conformal chamfered weld joints of FIG. 10.

FIG. 9 is a partial perspective view of the subframe assembly 10 at the connection 15 between the rear crossmember 30, the straight arm 50, and the side bracket 100, highlighting the associated weld joints 900. The base 110 of the side bracket 100, which is disposed abutting the outboard side of the straight arm 50, is welded directly to the outboard side of the straight arm 50 along the top and bottom edges of the base 110 and straight arm 50, as well as long the front edge of the base 110. The end bracket 34 of the rear crossmember 30 is also welded to the rear bracket arm 130 coupled to the base 110 at the top and bottom junctions between the end bracket 34 and the rear bracket arm 130. Further, the end bracket 34 is welded to the to and bottom surfaces of the straight arm 50.

Referring to FIGS. 10-13, in another exemplary embodiment, the subframe assembly 10 utilizes a side bracket 100 with a base 110 including an inboard side protrusion 1000 and a straight arm 50 with a corresponding recess 1010, as well as conformal chamfered weld joints 1020. As illustrated, a hollow or solid protrusion 1000 is disposed on the inboard side of the side bracket 100 extending from the base 110. This protrusion 1000 may have a substantially square shape, a substantially rectangular shape, or any other suitable shape, optionally having radiused corners, for example. The protrusion 1000 mates with a corresponding recess 1010 for in the outboard side of the straight arm 50, thereby increasing the strength of the subframe assembly 10 in this area and moving the weld joints 900 (FIG. 9) away from high stress areas along the top and bottom edges of the base 110. The top and bottom edges of the base 110, protrusion 1000, and recess 1010 include a chamfer 1030 that provides an enhanced conformal fillet weld joint 1020. Other weld joints may be as before. Advantageously, the conformal chamfered weld joint 1020 avoids potential weld cracking, with the protrusion 1000 and conformal recess 1010 significantly reducing lodas on the welds 900.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A subframe assembly for a vehicle, the subframe assembly comprising:
   a straight arm; and
   a side bracket comprising a base with front and rear portions disposed adjacent and coupled to an outboard side of the straight arm;
   wherein the outboard side of the straight arm defines a recess;
   wherein a central portion of an inboard side of the base of the side bracket between the front and rear portions comprises a protrusion that nests conformally within the recess defined by the outboard side of the straight arm; and
   wherein top and bottom edges of the outboard side of the straight arm, the recess, top and bottom edges of the inboard side of the base of the side bracket, and the protrusion are chamfered and the chamfered portions of the top and bottom edges of the outboard side of the straight arm, the recess, the top and bottom edges of the inboard side of the base of the side bracket, and the protrusion receive a weld to join the side bracket to the outboard side of the straight arm along the top and bottom edges of the outboard side of the straight arm, the recess, the top and bottom edges of the inboard side of the base of the side bracket, and the protrusion.

2. The subframe assembly of claim 1, wherein the protrusion is a square or rectangular protrusion having radiused corners.

3. The subframe assembly of claim 1, wherein the protrusion is a hollow structure.

4. The subframe assembly of claim 1, wherein the straight arm is an extruded structure.

5. The subframe assembly of claim 1, wherein the side bracket is adapted to receive a suspension component of the vehicle.

6. A side bracket for a subframe assembly for a vehicle, the side bracket comprising:
   a base with front and rear portions adapted to be disposed adjacent and coupled to an outboard side of a straight arm;
   wherein a central portion of an inboard side of the base between the front and rear portions comprises a protrusion that is adapted to nest conformally within a recess defined by the outboard side of a straight arm; and
   wherein top and bottom edges of the outboard side of the straight arm, the recess, top and bottom edges of the inboard side of the base of the side bracket, and the protrusion are chamfered and the chamfered portions of the top and bottom edges of the outboard side of the straight arm, the recess, the top and bottom edges of the inboard side of the base of the side bracket, and the protrusion are adapted to receive a weld to join the side bracket to the outboard side of the straight arm along the top and bottom edges of the outboard side of the straight arm, the recess, the top and bottom edges of the inboard side of the base of the side bracket, and the protrusion.

7. The side bracket of claim 6, wherein the protrusion is a square or rectangular protrusion having radiused corners.

8. The side bracket of claim 6, wherein the protrusion is a hollow structure.

9. The side bracket of claim 6, where the straight arm is an extruded structure.

10. The side bracket of claim 6, wherein the side bracket is adapted to receive a suspension component of the vehicle.

11. A straight arm for a subframe assembly for a vehicle, the straight arm comprising:
    an extruded structure having an outboard side adapted to be disposed adjacent and coupled to front and rear portions of a base of a side bracket;
    wherein the outboard side of the extruded structure defines a recess;
    wherein the recess is adapted to conformally receive a protrusion of a central portion of an inboard side of the base of the side bracket between the front an rear portions; and
    wherein top and bottom edges of the outboard side of the extruded structure, the recess, top and bottom edges of the inboard side of the base of the side bracket, and the protrusion are chamfered and the chamfered portions of the top and bottom edges of the outboard side of the extruded structure, the recess, the top and bottom edges of the inboard side of the base of the side bracket, and the protrusion are adapted to receive a weld to join the side bracket to the outboard side of the extruded structure along the top and bottom edges of the outboard side of the extruded structure, the recess, the top and bottom edges of the inboard side of the base of the side bracket, and the protrusion.

12. The straight arm of claim 11, where the protrusion is a square or rectangular protrusion having radiused corners.

13. The straight arm of claim 11, where the protrusion is a hollow structure.

14. The straight arm of claim 11, where the side bracket is adapted to receive a suspension component of the vehicle.

* * * * *